(12) United States Patent
Saji

(10) Patent No.: US 9,199,313 B2
(45) Date of Patent: Dec. 1, 2015

(54) CLAMPING DEVICE FOR CUTTING INSERT, CUTTING TOOL, AND CUTTING INSERT

(71) Applicant: TUNGALOY CORPORATION, Iwaki-shi, Fukushima (JP)

(72) Inventor: Ryuichi Saji, Iwaki (JP)

(73) Assignee: TUNGALOY CORPORATION, Iwaki-shi (JP)

( * ) Notice: Subject to any disclaimer, the term of this patent is extended or adjusted under 35 U.S.C. 154(b) by 363 days.

(21) Appl. No.: 13/753,045

(22) Filed: Jan. 29, 2013

(65) Prior Publication Data

US 2013/0142579 A1 Jun. 6, 2013

Related U.S. Application Data

(63) Continuation-in-part of application No. PCT/JP2012/061769, filed on May 8, 2012.

(30) Foreign Application Priority Data

May 12, 2011 (JP) .................................. 2011-106772

(51) Int. Cl.
*B23B 27/08* (2006.01)
*B23B 27/16* (2006.01)
*B23B 27/10* (2006.01)

(52) U.S. Cl.
CPC ............ *B23B 27/1651* (2013.01); *B23B 27/10* (2013.01); *B23B 27/1622* (2013.01);
(Continued)

(58) Field of Classification Search
CPC .................. Y10T 407/2274; Y10T 407/2276; Y10T 407/2278; Y10T 407/228; Y10T 407/2282; Y10T 407/2292; B23B 27/16; B23B 27/1614; B23B 27/1622; B23B 27/1644; B23B 27/1651; B23B 27/1662; B23B 27/1666; B23B 27/1667; B23B 2205/04; B23B 2205/045
USPC ................. 407/103, 104, 105, 106, 107, 112
See application file for complete search history.

(56) References Cited

U.S. PATENT DOCUMENTS 3,280,450 A 10/1966 Sirola
3,973,309 A 8/1976 Kummer
(Continued)

FOREIGN PATENT DOCUMENTS

EP 1075340 2/2001
FR 1574882 A * 7/1969
(Continued)

OTHER PUBLICATIONS

English Translation of FR 1574882 A, Jul. 1969.*
(Continued)

*Primary Examiner* — Sunil K Singh
*Assistant Examiner* — Alan Snyder
(74) *Attorney, Agent, or Firm* — Womble Carlyle Sandridge & Rice PLLC

(57) ABSTRACT

A clamping device having a high clamping force and operability when a cutting insert is attached/detached is provided. The clamping device has a guide hole, a screw hole, a clamp member having a clamp portion and arranged movably in the guide hole, and a screw member screwed with the screw hole and movable in first and second directions, wherein the screw member can be engaged with the clamp member in movement both in the directions and the guide hole has a first cam surface engaged with the clamp member and converting a force in the first direction received from the screw member into a force for moving the clamp member in a direction toward the cutting insert and a second cam surface converting a force in the second direction into a force for moving the clamp portion in a direction away from the cutting insert.

18 Claims, 14 Drawing Sheets

(52) U.S. Cl.
CPC ......... *B23B27/1644* (2013.01); *B23B 27/1677* (2013.01); *B23B 2200/0461* (2013.01); *B23B 2200/3618* (2013.01); *B23B 2205/04* (2013.01); *Y10T 407/2222* (2015.01); *Y10T 407/2228* (2015.01); *Y10T 407/2278* (2015.01)

(56) References Cited

U.S. PATENT DOCUMENTS

| | | | |
|---|---|---|---|
| 6,053,669 A | 4/2000 | Lagerberg | |
| 6,158,928 A | 12/2000 | Hecht | |
| 7,431,539 B2 | 10/2008 | Erickson et al. | |
| 8,613,576 B2 * | 12/2013 | Ebert et al. | 407/113 |
| 2004/0081521 A1 | 4/2004 | Erickson | |
| 2006/0291965 A1 * | 12/2006 | Erickson et al. | 407/102 |
| 2008/0193233 A1 | 8/2008 | Park | |
| 2009/0175695 A1 | 7/2009 | Endres | |

FOREIGN PATENT DOCUMENTS

| | | | |
|---|---|---|---|
| JP | S53-006989 A | | 1/1978 |
| JP | S62-072018 U1 | | 5/1987 |
| JP | 2006055916 A | * | 3/2006 |
| JP | 2006 263856 | | 10/2006 |

OTHER PUBLICATIONS

International Search Report dated Jun. 19, 2012 issued in PCT counterpart application (No. PCT/JP2012/061769).
International Preliminary Report on Patentability (IPRP) dated Nov. 12, 2013 issued in PCT counterpart application (No. PCT/JP2012/061769) with English Translation.
Extended European Search Report in PCT/JP2012/061769, dated Aug. 15, 2014.
Office Action dated Feb. 3, 2015 issued in Chinese counterpart application (No. 201280021232.4) with English translation.

* cited by examiner

US 9,199,313 B2

CLAMPING DEVICE FOR CUTTING INSERT, CUTTING TOOL, AND CUTTING INSERT

CROSS-REFERENCE TO RELATED APPLICATIONS

This application is a continuation-in-part of PCT application No. PCT/JP2012/061769, filed May 8, 2012 and published as WO 2012/153737A1, which claims the benefit of Japanese Patent Application 2011-106772, filed May 12, 2011. The contents of the aforementioned applications are incorporated by reference in their entirety.

BACKGROUND OF THE INVENTION

1. Field of the Invention

The present invention relates to a clamping device for clamping a cutting insert to a tool body, a cutting tool provided with this clamping device, and a cutting insert suitable for this clamping device.

2. Description of the Related Art

Prior-art clamping devices for a cutting insert include one disclosed in, for example, U.S. Pat. No. 7,431,539. This device has a clamp pin and a lock screw for clamping a cutting insert in a tool holder. The clamp pin is provided with a clamp portion and first and second cam surfaces and is arranged in a first hole penetrating from a top surface to a bottom surface of the tool holder. The lock screw has first and second cam surfaces capable of being engaged with the first and second cam surfaces of the clamp pin, respectively, and is provided movably in a second hole formed intersecting with the first hole and threaded. When the lock screw is rotated in a first direction, the first cam surface is engaged, and the clamp pin is moved in a direction in which the clamp portion is moved downward and toward the cutting insert. When the lock screw is rotated in a second direction, the second cam surface is engaged, and the clamp pin is moved upward and in a direction away from the cutting insert.

SUMMARY OF THE INVENTION

The present invention provides a clamping device in which operability when attaching/detaching the cutting insert is further improved and a clamping force is enhanced, a cutting insert suitable for that, and a cutting tool provided with this clamping device.

A clamping device of the present invention is a clamping device for clamping a cutting insert to a tool body, including:
a guide hole of the tool body;
a screw hole formed in a direction intersecting with the guide hole from one side surface of the tool body and connected to the guide hole;
a clamp member having a clamp portion and being arranged movably in a predetermined guiding direction in the guide hole; and
a screw member screwed with the screw hole and movable in first and second directions by rotation, wherein
the screw member is formed capable of engagement with the clamp member in both movements in the first and second direction; and
the guide hole has a first sliding surface engaged with the clamp member and converting a force in the first direction received by the clamp member from the screw member into a force for moving the clamp portion on the guide hole side and in a direction toward the cutting insert, and a second sliding surface engaged with the clamp member and converting the second force received by the clamp member from the screw member into a force for moving the clamp portion on the side opposite to the guide hole and in a direction away from the cutting insert.

A cutting tool of the present invention is a cutting tool provided with the clamping device of the present invention.

A cutting insert of the present invention is characterized in that indexable surfaces are provided in plural in a peripheral direction of an inner peripheral surface.

According to the present invention, a clamping device with high clamping force and high operability, a cutting insert suitable for that, and a cutting tool provided with this clamping device are provided.

Further features of the present invention will become apparent from the following description of exemplary embodiments (with reference to the attached drawings).

DETAILED DESCRIPTION

First Embodiment

Figure 1A:
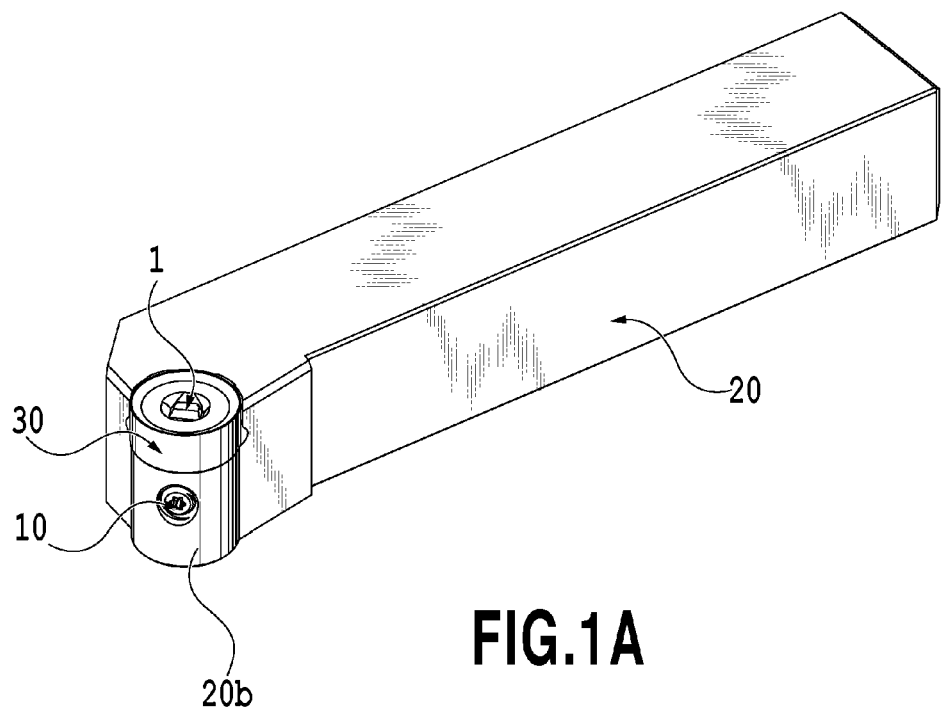
FIG. 1A is a perspective view of a cutting tool to which a clamping device according to a first embodiment of the present invention is applied.
Figure 1B:
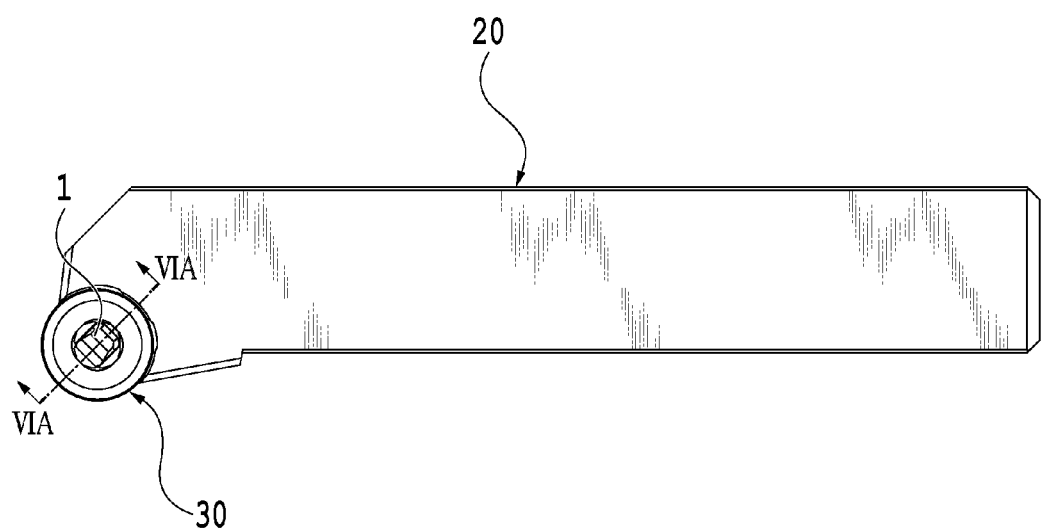
FIG. 1B is a plan view of the cutting tool in FIG. 1A.

A cutting tool to which the clamping device according to a first embodiment of the present invention is applied will be described by referring to the attached drawings. The cutting tool according to the embodiment has, as illustrated in FIGS. 1A and 1B, a clamp member 1, a screw member 10, a tool body 20, and a cutting insert 30. The clamping device used in this cutting tool is for clamping the cutting insert 30 to the tool body 20.

Figure 2:
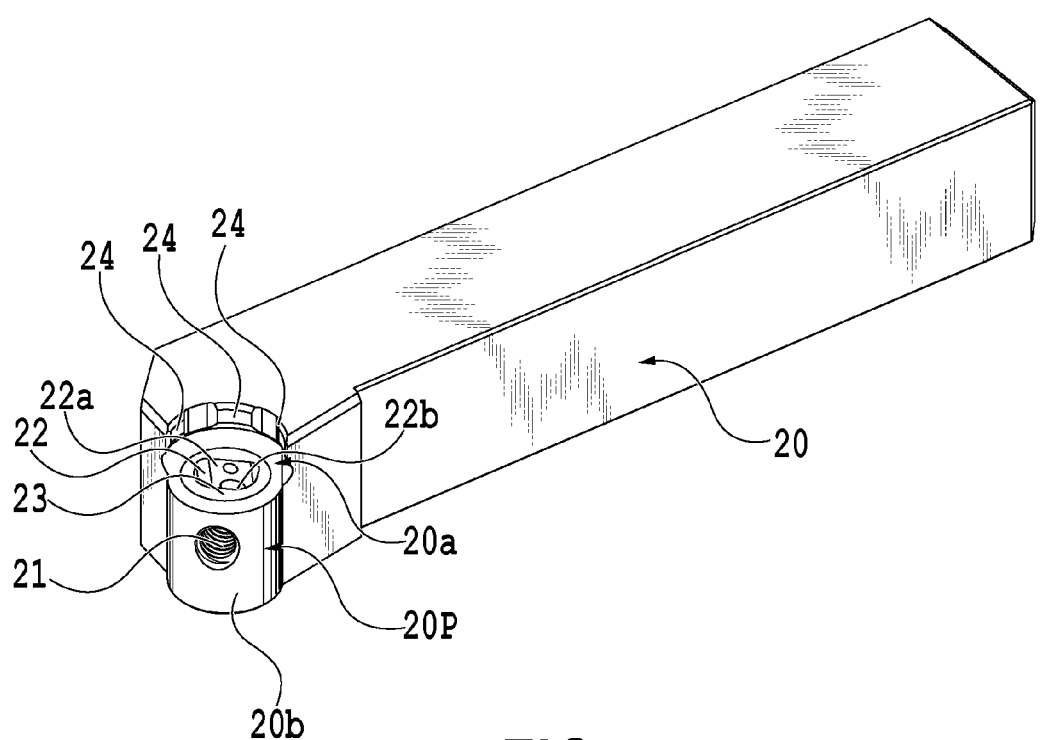
FIG. 2 is a perspective view of a tool body in the cutting tool in FIG. 1A.

The tool body 20 is, as illustrated in FIG. 2, formed of an elongated rod-shaped member having a rectangular cross-section and has a substantially columnar protruding portion 20p protruding outward on a leading end portion. The protruding portion 20p has a guide hole 22 penetrating from its upper surface to a bottom surface formed. The guide hole 22 movably guides the clamp member 1 arranged inside in a predetermined guiding direction, that is, a direction in which the guide hole 22 penetrates. Above the protruding portion 20p, an insert seat 20a on which the cutting insert 30 is placed is formed. The insert seat 20a has an insert seat surface 23 formed of a plane formed around the guide hole 22 and a side wall surface 24 extending in a direction orthogonal to the seat surface 23 and being curved in an arc-shape. The guide hole 22 opens out to the insert seat surface 23.

Figure 6A:
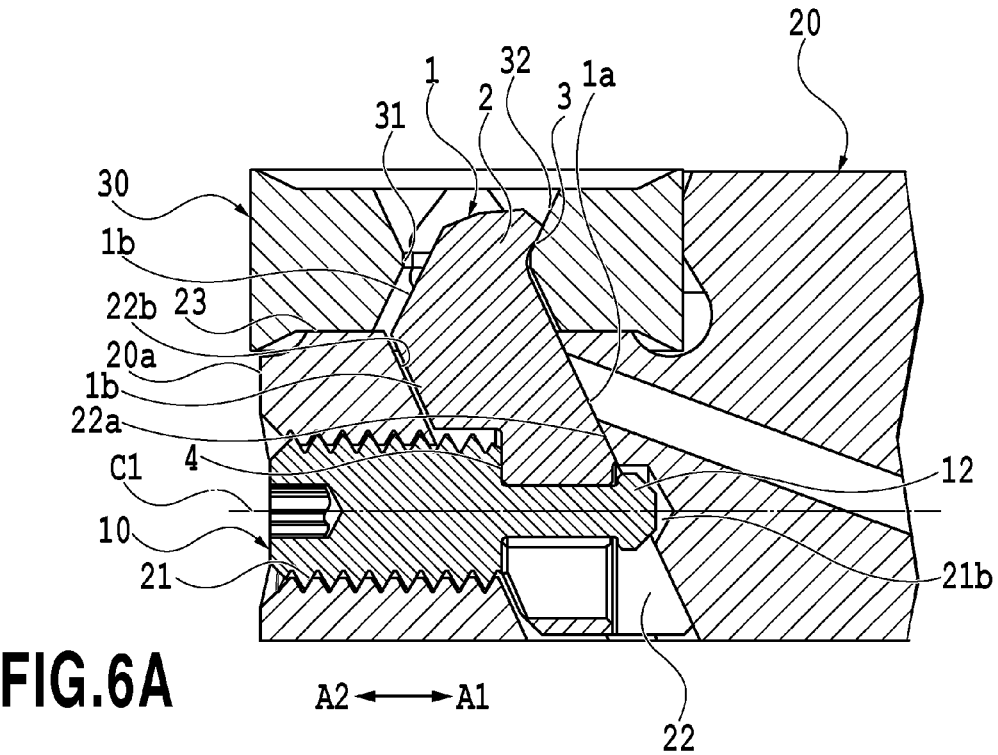
FIG. 6A is a cross-sectional view in VIA-VIA line direction in FIG. 1B and a view illustrating a clamping device in a clamp state.
Figure 6B:
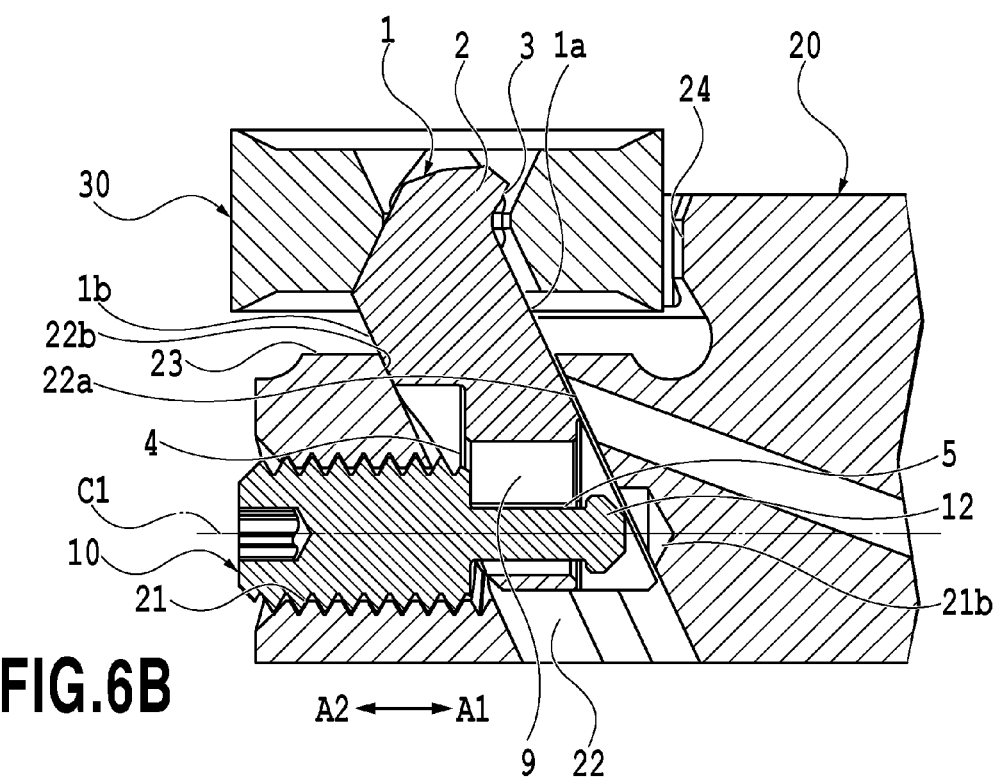
FIG. 6B is a cross-sectional view in VIA-VIA line direction in FIG. 1B and a view illustrating a clamping device in an unclamp state.
Figure 7A:
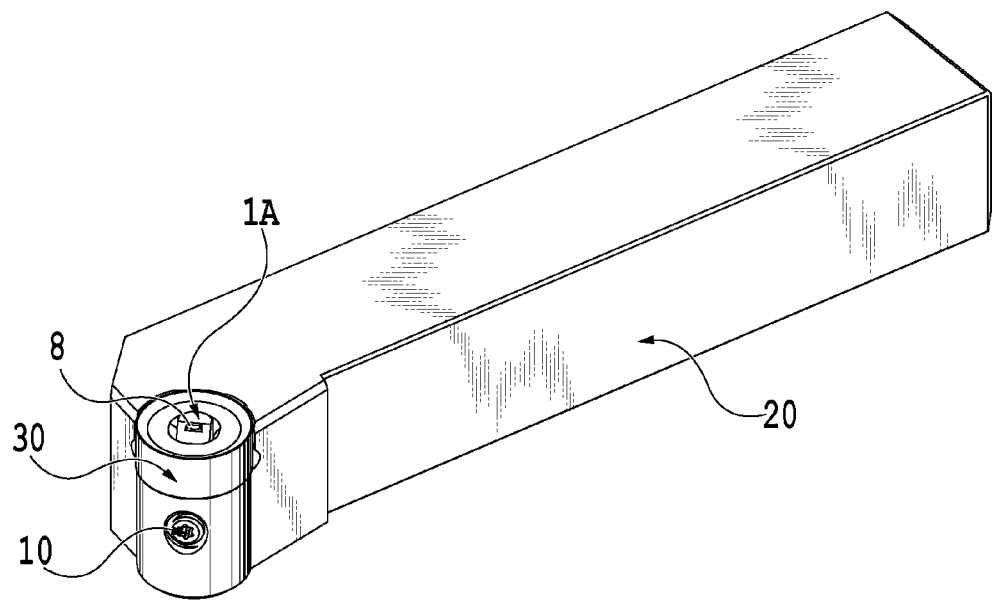
FIG. 7A is a perspective view of a cutting tool according to a second embodiment of the present invention.
Figure 7B:
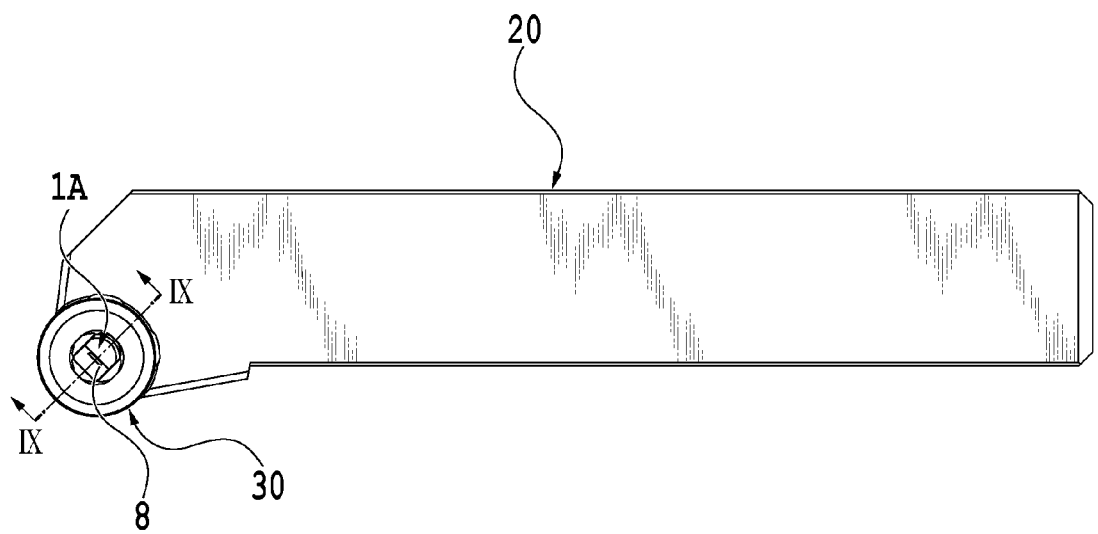
FIG. 7B is a plan view of the cutting tool in FIG. 7A.
Figure 8:
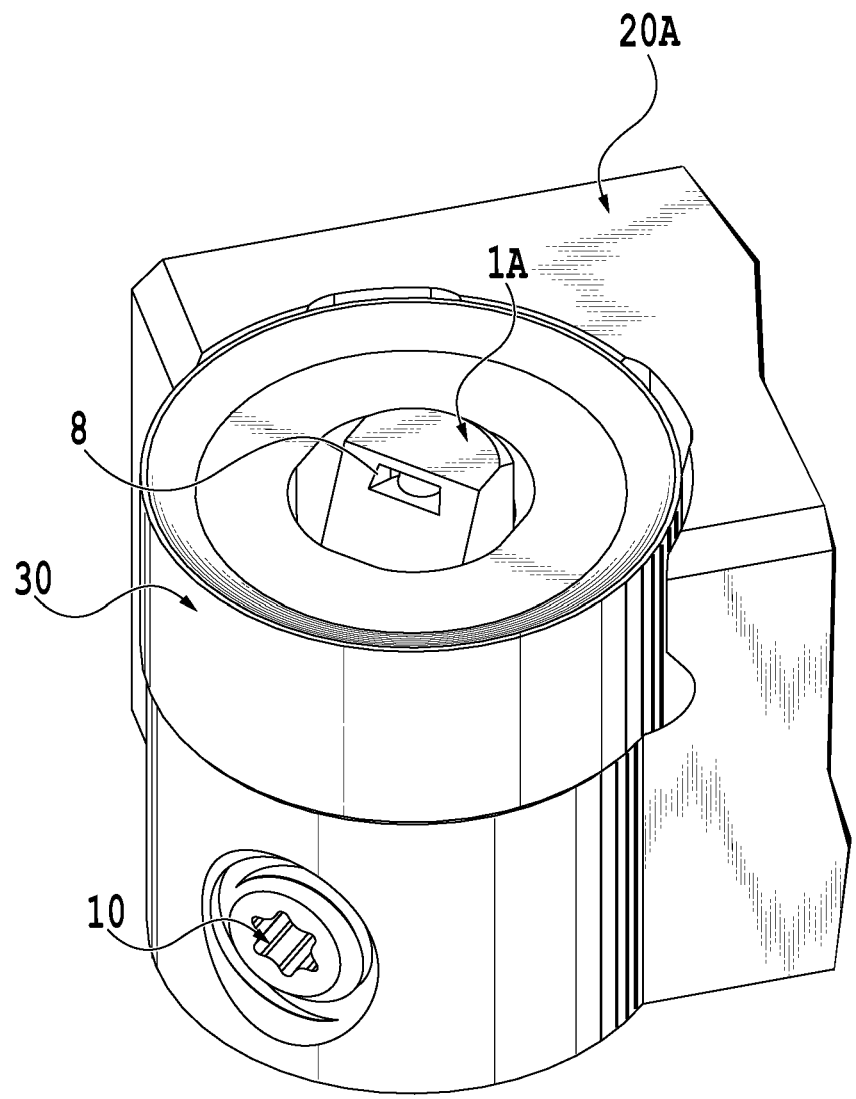
FIG. 8 is an enlarged perspective view of a cutting tool leading end portion in FIG. 7A.

The guide hole 22 is, as illustrated in FIGS. 2, 6A, and 6B, constituted by planes and has mutually opposing first and second sliding surfaces 22a and 22b. The first and second sliding surfaces 22a and 22b are inclined with respect to the seat surface 23 of the insert seat 20a and the side wall surface 24. The functions of the first and second sliding surfaces 22a and 22b will be described later.

In a head part which is the protruding portion 20p from a shank, a screw hole 21 is formed in a direction intersecting with the guide hole 22 from a side surface 20b thereof. This screw hole 21 is connected to the guide hole 22 and does not penetrate the tool body 20. The screw hole 21 is formed so that its central axis line C1 becomes substantially parallel to the seat surface 23 of the insert seat 20a. Moreover, as illustrated in FIGS. 6A and 6B, a pilot hole for forming the screw hole 21 penetrates the first sliding surface 22a, and this penetration portion defines a relief region 21b for a diameter enlarged portion 12 of the screw member 10 which will be described later.

Figure 3A:
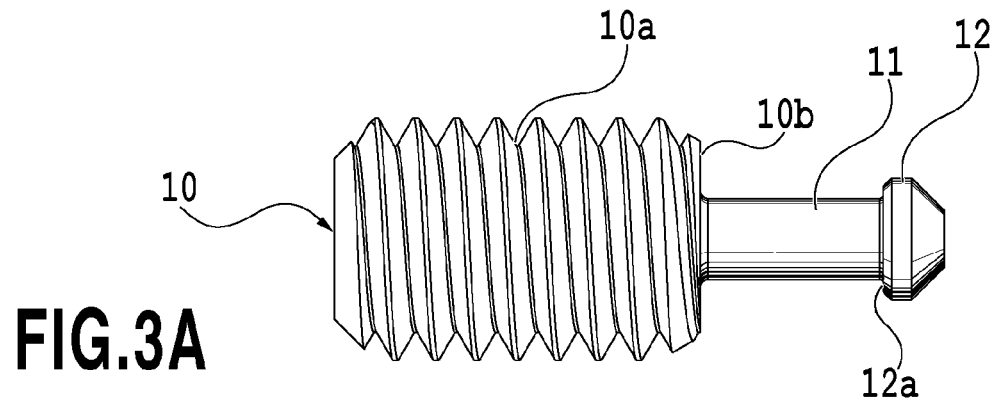
FIG. 3A is a front view of a screw member according to an embodiment of the present invention.
Figure 3B:
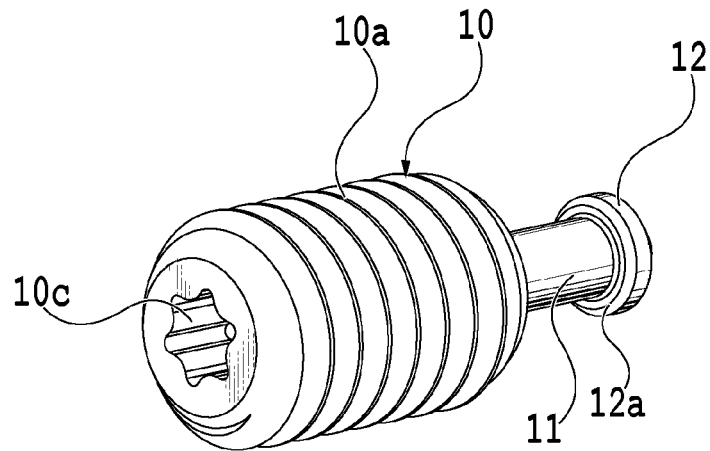
FIG. 3B is a perspective view of the screw member in FIG. 3A.
Figure 3C:
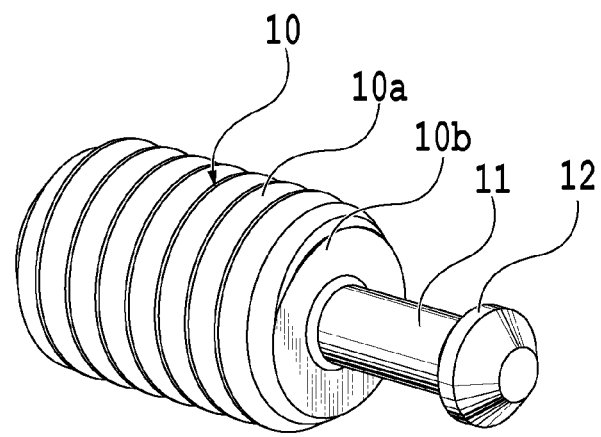
FIG. 3C is a perspective view of the screw member in FIG. 3A from another direction.

The screw member 10 advances in an A1 ("forward") direction in FIG. 6A by being rotated in one direction and retreats in an A2 ("rearward") direction illustrated in FIG. 6B by being rotated in the other direction. The screw member 10 has, as illustrated in FIGS. 3A to 3C, a threaded portion 10a screwed with the screw hole 21, a columnar shaft portion 11 extending in a longitudinal direction from the leading end portion of the threaded portion 10a and having a diameter smaller than that of the threaded portion 10a, and a diameter enlarged portion 12 being formed at the leading end portion of the shaft portion 11 and having a diameter enlarged from the shaft portion 11. Moreover, on a rear end surface of the threaded portion 10a, a torx hole 10c into which a torx driver is to be inserted is formed. The screw member 10 includes a forward facing thread shoulder portion 10b formed between the threaded portion 10a and the shaft portion 11 and a rearward facing end shoulder portion 12a formed between the shaft portion 11 and the diameter enlarged portion 12. The forward facing thread shoulder portion 10b is configured to engage with a first screw engagement surface 4 which will be described later of the clamp member 1, while the rearward facing end shoulder portion 12a is configured to engage with a second screw engagement surface 5 which will be described later with respect to the clamp member 1.

The clamp member 1 has, as illustrated in FIGS. 4A to 4H, a main portion 1M formed having a columnar shape having a substantially rectangular outer profile shape when seen from the front side and a clamp portion 2 protruding from the leading end portion in the longitudinal direction of the main portion 1M.

On the lower end side of the main portion 1M of the clamp member 1, a keyhole-shaped long hole 7 is formed, through which the central axis line C1 passes. The long hole 7 is formed of a lower insertion portion 7b (first insertion portion) into which the threaded portion 10a of the screw member 10 cannot be inserted, but the diameter enlarged portion 12 and the shaft portion 11 can be inserted, and an upper insertion portion 7a (second insertion portion) which is connected to this lower portion 7b and in which only the shaft portion 11 can be accommodated, and not the diameter enlarged portion 12 or the threaded portion 10a. The lower insertion portion 7b is both wider than the upper insertion portion 7a and further from the clamp portion 2 than the upper insertion portion 7a. This long hole 7 is provided so as to make the screw member 10 movable in the penetrating direction of the guide hole 22 of the clamp member 1.

Figure 4A:
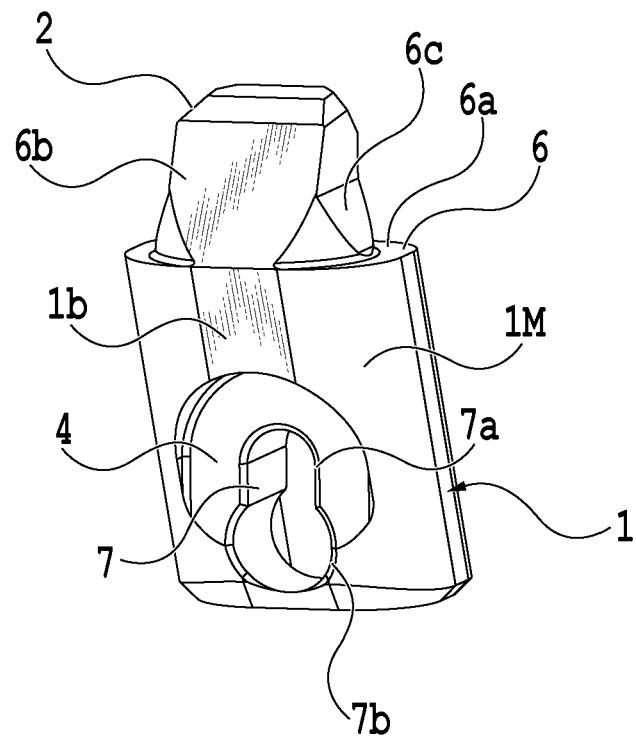
FIG. 4A is a perspective view of a clamp member according to an embodiment of the present invention.

As illustrated in FIG. 4A, the first screw engagement surface 4 is formed so as to surround the upper portion 7a of the long hole 7 on one of the surfaces of the main portion 1M. With this first screw engagement surface 4, the forward facing thread shoulder portion 10b of the screw member 10 is engaged when the screw member 10 is moved in the forward, or A1 direction, further into the screw hole 21.

Figure 4B:
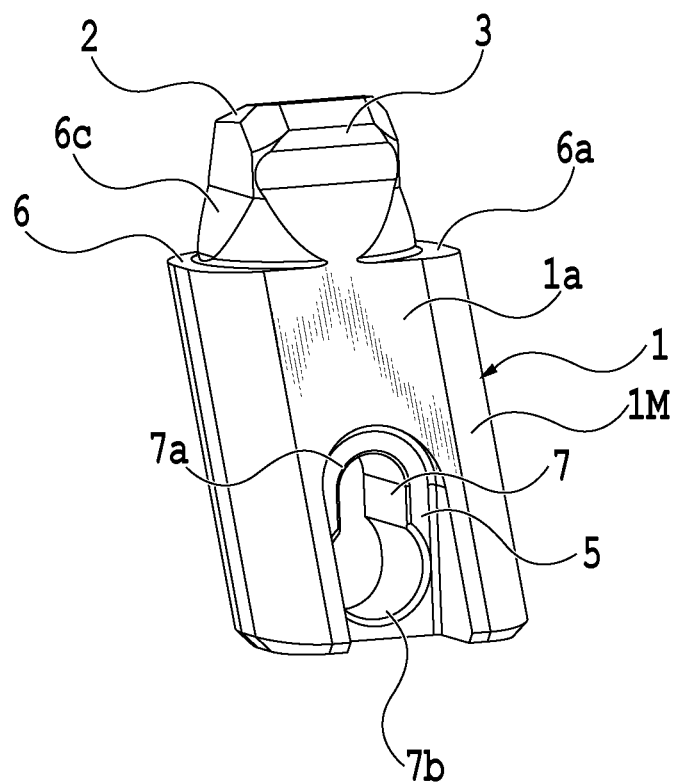
FIG. 4B is a perspective view of the clamp member in FIG. 4A from another direction.
Figure 4C:
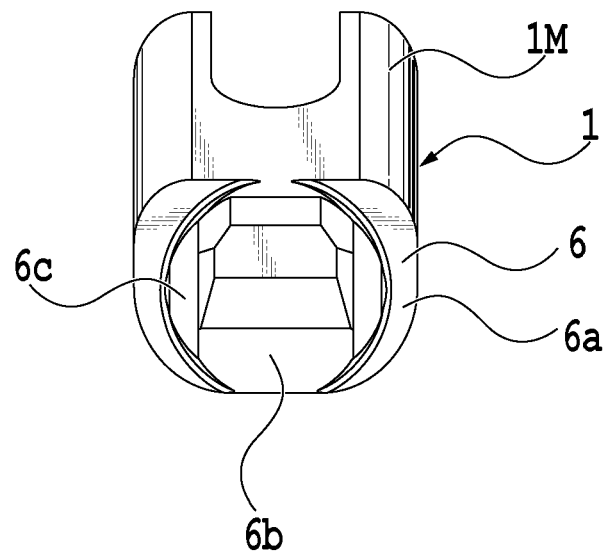
FIG. 4C is a plan view of the clamp member in FIG. 4A.
Figure 4D:
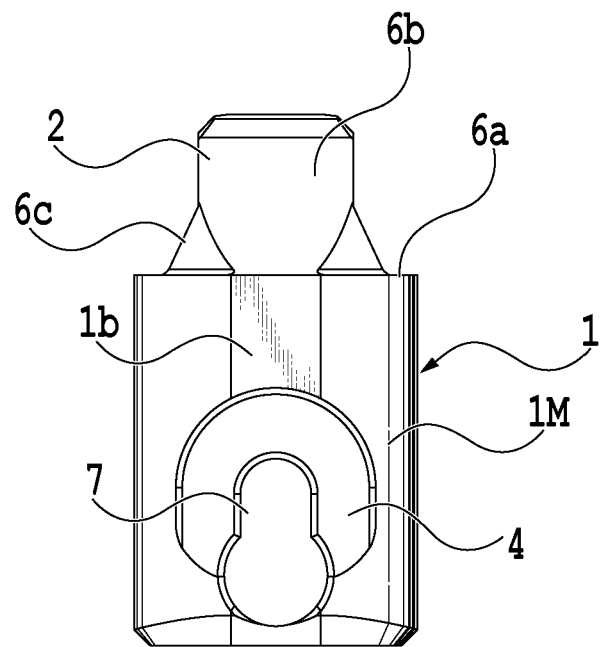
FIG. 4D is a front view of the clamp member in FIG. 4A.

As illustrated in FIG. 4B, on the other surface of the main portion 1M, the second screw engagement surface 5 is formed so as to surround the upper portion 7a of the long hole 7. This second screw engagement surface 5 is engaged with the rearward facing end shoulder portion 12a of the screw member 10 when the screw member 10 is moved in the rearward, or A2 direction, and withdrawn from the screw hole 21.

The first and second screw engagement surfaces 4 and 5 are constituted by planes and, as illustrated in FIGS. 6A and 6B, are arranged in a direction substantially orthogonal to a central axis line C1 of the screw hole 21 and face in generally opposite directions. It should be noted that in the embodiment, the long hole 7 is formed in order to make the clamp member 1 movable, but the lower end side of the long hole 7 may have an open notched shape. In that case, only the upper portion 7a of the long hole 7 is important, while the periphery of the lower portion 7b does not matter so long as it does not interfere with the screw 10 and the clamp member. In fact, in some embodiments, the lower portion 7b may even be deleted, in which case the length of the clamp member 1 can be reduced.

On one of the surfaces on the upper end side of the main portion 1M of the clamp member 1, as illustrated in FIG. 4B, a first contact surface 1a engaged with the first sliding surface 22a formed in the guide hole 22 is formed in a central region in the width direction of the main portion 1M. On the other surface of the upper end side of the main portion 1M, as illustrated in FIG. 4A, a second contact surface 1b engaged with the second sliding surface 22b formed in the guide hole 22 is formed in the central region in the width direction of the main portion 1M. The first and second contact surfaces 1a and 1b are constituted by planes, and as obvious from FIGS. 6A and 6B, they are inclined with respect to the first and second screw engagement surfaces 4 and 5, respectively. First and second contact surfaces 1a, 1b travel along the first and second sliding surfaces 22a, 22b, respectively, as the clamp member 1 clamps and unclamps the insert 20.

The clamp portion 2 of the clamp member 1 is engaged with an inner peripheral surface of the mounting hole 31 of the cutting insert 30, when the cutting insert 30 is to be clamped to the insert seat 20a. The clamp portion 2 of the clamp member 1 is formed having a dimension capable of passing through the insert mounting hole 31 when the cutting insert 30 is attached/removed. As a result, only by slightly withdrawing the clamp member 1 when it is attached to the tool body 20, can the cutting insert 30 be attached/removed. This clamp portion 2 has an insert contact surface 3 making contact with the inner peripheral surface of the insert mounting hole 31 which will be described later, as illustrated in FIG. 4B. This insert contact surface 3 is constituted by a plane having a predetermined width and extends in a direction intersecting with the longitudinal direction of the clamp member 1.

When the cutting insert 30 is unclamped, a support surface 6 may support the cutting insert. The support surface 6 may comprise an upper shoulder surface 6a of the main portion 1M of the clamp member 1, a sloped surface 6b formed on the side opposite to the insert contact surface 3 of the clamp portion 2, and a collar surface 6c formed on both sides of the clamp portion 2. As will be described later, when the cutting insert 30 is unclamped, the clamp portion 2 of the clamp member 1 moves in a direction away from the cutting insert 30. At this time, the support surface 6 supports the cutting insert 30 and separates the cutting insert 30 away from the insert seat 20a. By forming the support surface 6 on the clamp portion 2, when removing the cutting insert 30 which had been firmly fixed during the cutting, the cutting insert can be easily pushed to be separated. For example, the round plate-like cutting insert 30 can rotate easily during cutting, and thus there is a case where the insert seat 20a of the tool body is actively and elastically deformed, to thereby prevent movement of the cutting insert 30 in the rotating direction. In such a case, there is no problem during cutting, but when the cutting insert 30 is to be detached, the cutting insert 30 cannot be easily removed, which makes a problem. The present invention is also effective in such a case, and since the cutting insert 30 can be pushed to be separated by the clamp member 1, the cutting insert is easily lifted from the insert seat. That is, operability during attachment/removal of the cutting insert 30 is drastically improved. It should be noted that the support surface 6 does not have to be formed on all the surfaces 6a, 6b, and 6c but functions only if it is formed on any one of them. The support surface 6 may be formed anywhere in the clamp member 1 as long as the support surface is formed at a position in which making contact with the cutting insert 30 and separation of the cutting insert 30 from the insert seat 20a of the tool body 20 are possible.

Figure 4E:
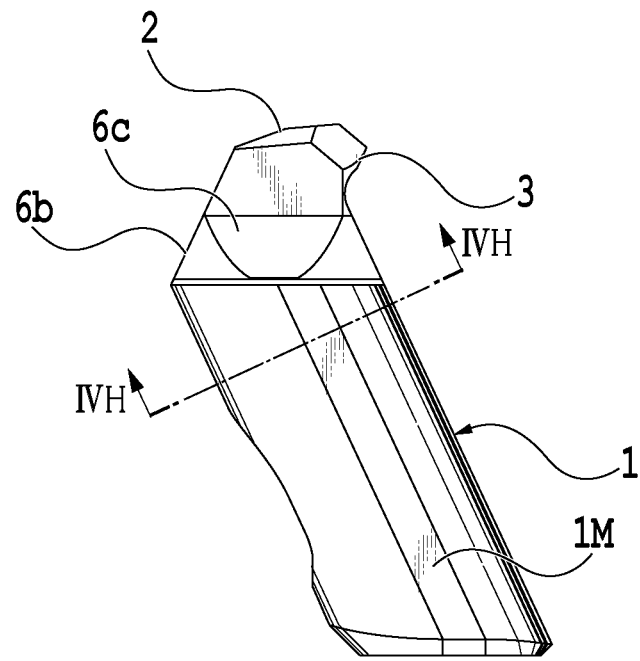
FIG. 4E is a right side view of the clamp member in FIG. 4A.
Figure 4F:
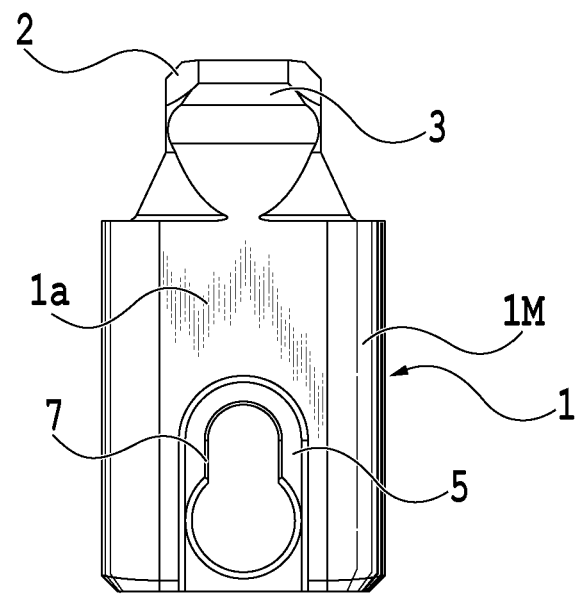
FIG. 4F is a rear view of the clamp member in FIG. 4A.
Figure 4G:
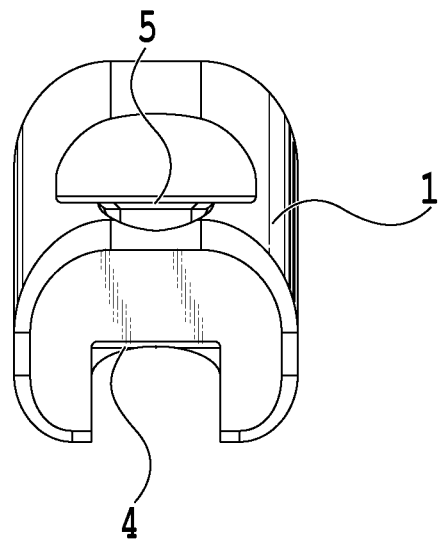
FIG. 4G is a bottom view of the clamp member in FIG. 4A.
Figure 4H:
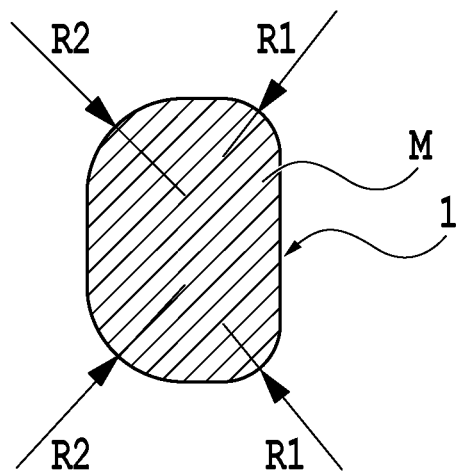
FIG. 4H is a cross-sectional view in IVH-IVH line direction in FIG. 4E.
Figure 5A:
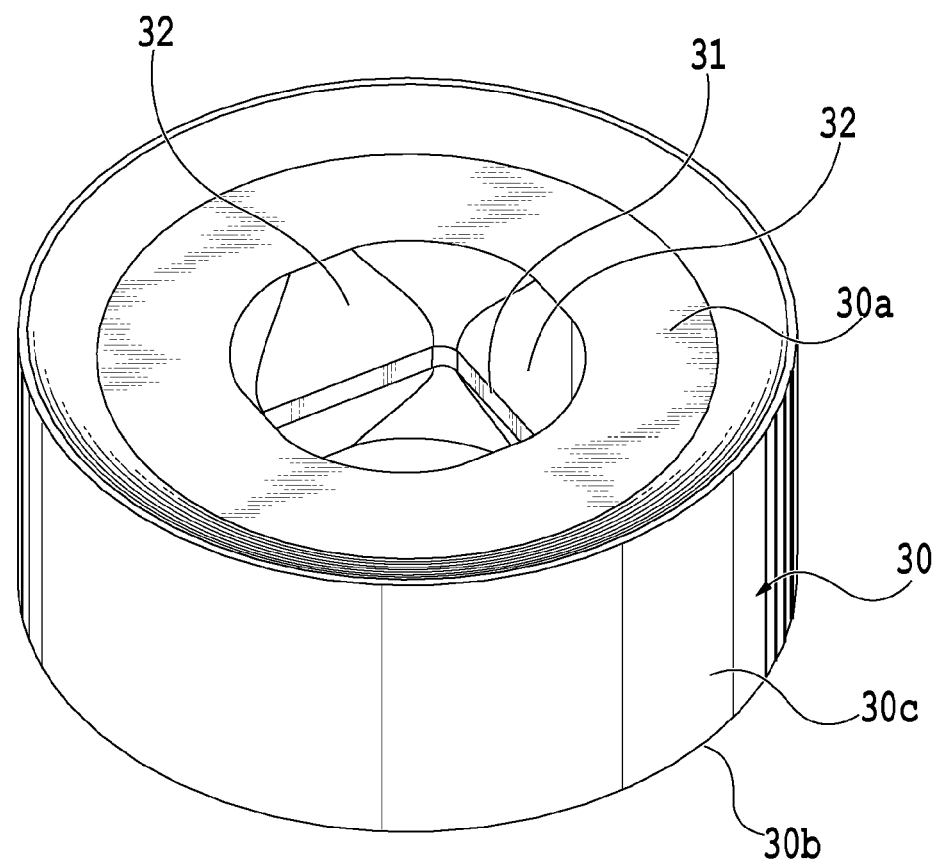
FIG. 5A is a perspective view of a cutting insert according to an embodiment of the present invention.
Figure 5B:
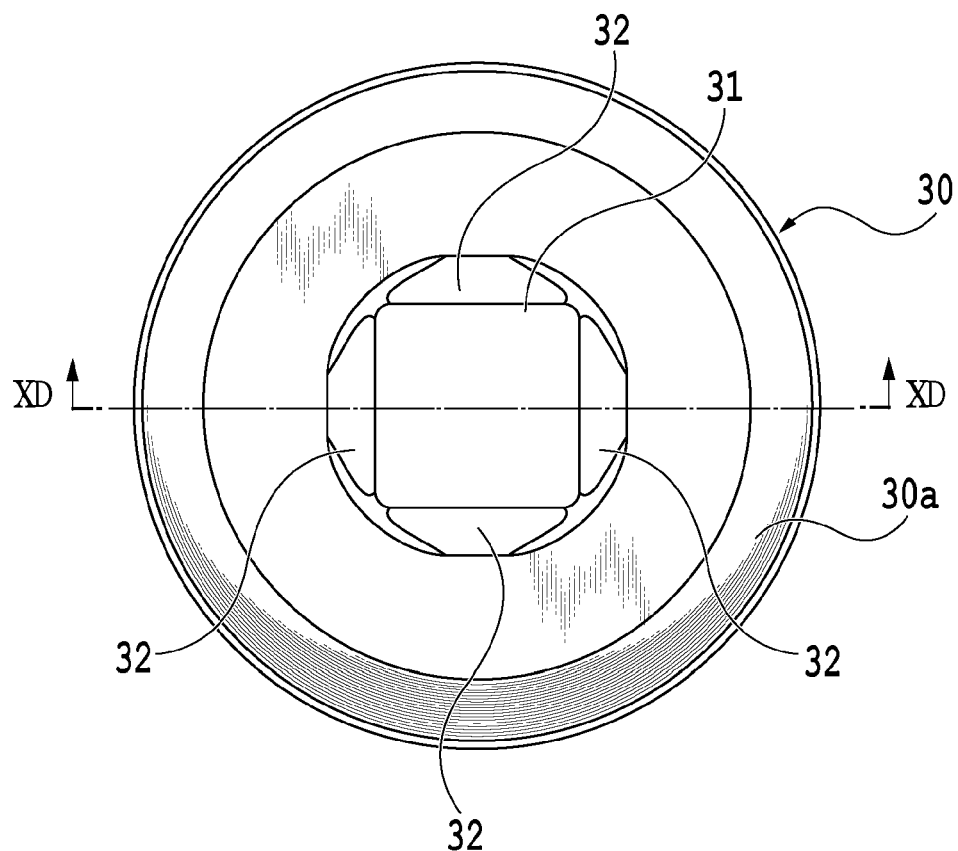
FIG. 5B is a plan view of the cutting insert in FIG. 5A.
Figure 5C:
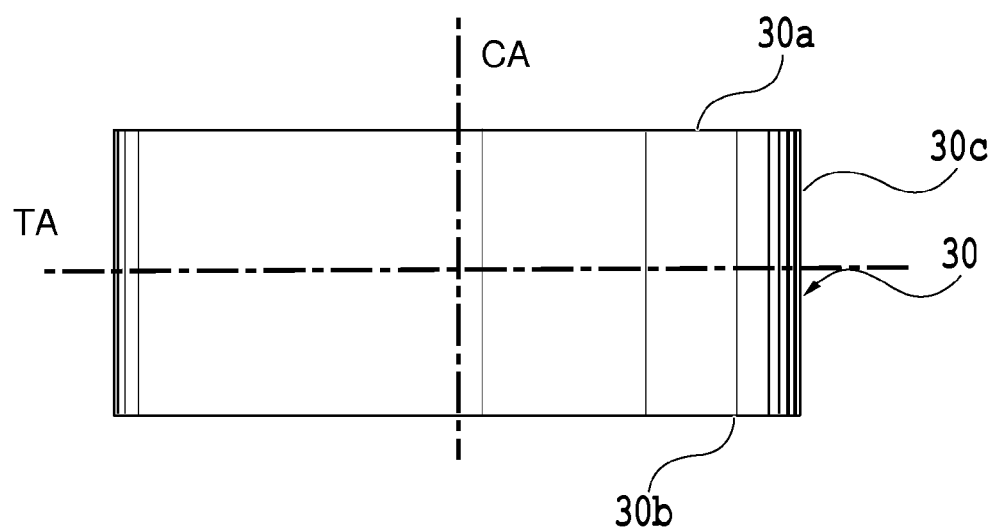
FIG. 5C is a front view of the cutting insert in FIG. 5A.
Figure 5D:
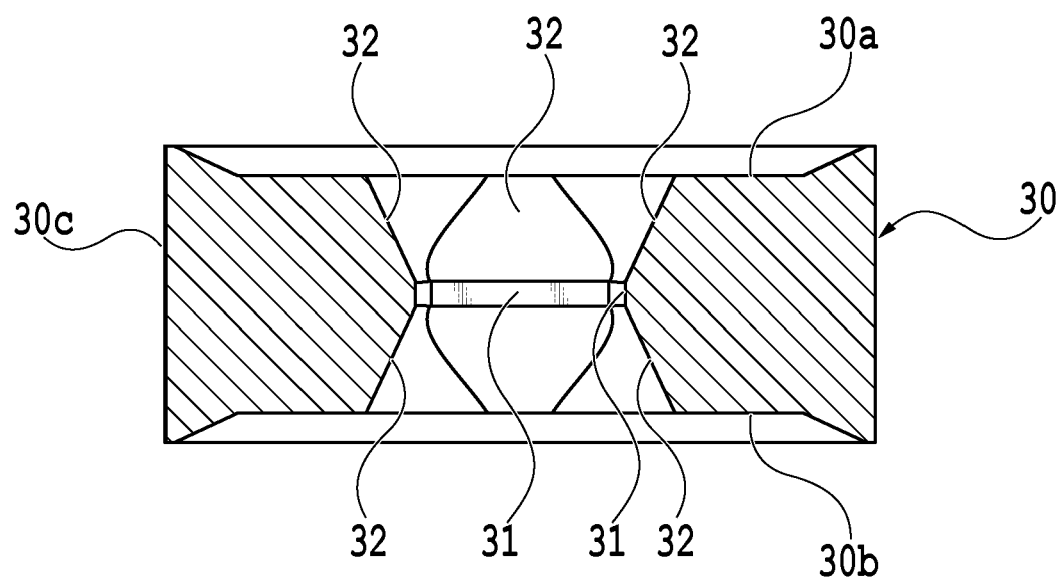
FIG. 5D is a cross-sectional view in XD-XD line direction in FIG. 5B.

FIG. 4H is a cross-sectional view in IVH-IVH line direction of FIG. 4E. The cross-sectional shape of the main portion 1M of the clamp member 1 has a basic shape of a rectangle rounded with radii of curvature R1 or R2 at each of four corner portions. This shape is similar to a cross-sectional shape of the guide hole 22 on the tool body 20 into which the main portion 1M of the clamp member 1 is inserted. These cross-sectional shapes may be long hole shapes or the like.

An appropriate gap between the main portion 1M of the clamp member 1 and the guide hole 22 is provided so that the clamp member 1 can move through the guide hole 22 without being too loose or too tight. In the embodiment, the main portion 1M has four side surfaces orthogonal to each other, each being formed of a plane, and thus the gap between the main portion 1M of the clamp member 1 and the guide hole 22 is easily adjusted. In the embodiment, the radius of curvature R1 is set to approximately 1.0 mm, and the radius of curvature R2 is set to approximately 1.5 mm. The radius of curvature R1 is smaller than the radius of curvature R2, because contact area is increased when the clamp member 1 is pressed onto the guide hole 22, when the screw member 10 is advanced in the A1 direction. of the screw member 10. When the contact area is large the clamp member 1 and the guide hole 22 can easily adhere firmly to each other, and a firm clamping force is obtained. The radius of curvature R1 should not be too small. When the radius of curvature R1 is too small, machining of the guide hole 22 on the tool body 20 side becomes difficult, and the clamp member 1 and the guide hole 22 cannot be easily fitted with each other with high accuracy. For machining of the guide hole 22, end mill processing or grinding processing by using grinding wheel, electric discharge machining and the like can be applied. The radius of curvature R1 is preferably set to 0.5 mm or more. The radius of curvature R2 is adjusted as appropriate while strength of the clamp member 1 is ensured. The radius of curvature R2 is preferably set to be the same as the radius of curvature R1 or to be larger than that. That is, it is preferable that R2≥R1 holds.

The cutting insert 30 has, as illustrated in FIGS. 5A to 5D, an upper surface 30a and a lower surface 30b, facing in opposite directions and each having a circular outer shape, a side surface 30c extending between the upper surface 30a and the lower surface 30b, and the insert mounting hole 31 penetrating the upper surface 30a and the lower surface 30b. The cutting insert 30 is formed vertically symmetric and so is reversible, or "double-sided". A cutting edge is formed at an intersection portion between the side surface 30c and the upper surface 30a as well as the lower surface 30b. Moreover, on an inner peripheral surface of the mounting hole 31, a plurality of indexable surfaces 32 are formed. The function of the indexable surface 32 will be described later.

Next, a clamping operation and an unclamping operation of the clamping device having the above-described configuration will be described by referring to FIGS. 6A and 6B. As illustrated in FIG. 6B, when the clamping device is in an unclamped state, the cutting insert 30 is placed on the clamp member 1 so that the clamp portion 2 is inserted into the mounting hole 31 of the cutting insert 30. At this time, the support surface 6 of the clamp member 1 supports the cutting insert 30. Then, by rotating the screw member 10 so as to advance in the inward A1 direction, the forward facing thread shoulder portion 10b of the screw member 10 is engaged with the first screw engagement surface 4 of the clamp member 1, and a force in the A1 direction is applied to the clamp member 1. When the clamp member 1 is pressed in the A1 direction and the first contact surface 1a of the clamp member 1 is engaged with the first sliding surface 22a of the guide hole 22, the first sliding surface 22a converts the force in the A1 direction into a force for moving the clamp member 1 toward a lower part of the guide hole 22. When the clamp member 1 moves toward the lower part of the guide hole 22, the clamp portion 2 moves in a direction toward the cutting insert 30, and the insert contact surface 3 of the clamp portion 2 makes contact with the indexable surface 32 of the mounting hole 31 of the cutting insert 30. Moreover, by rotating the screw member 10 so as to advance in the A1 direction, the insert contact surface 3 presses the cutting insert 30 toward the seat surface 23 of the insert seat 20a and the side wall surface 24. As a result, as illustrated in FIG. 6A, the cutting insert 30 reaches a state of being clamped by the tool body 20. That is, a firm clamping force is obtained. An inclination angle of the guide hole 22 with respect to the seat surface 23 of the insert seat 20a is preferably in an angular range of 20 degrees or more and 40 degrees or less on the basis of a straight line perpendicular to the seat surface 23. If this inclination angle is less than 20 degrees or exceeds 40 degrees, when the central axis line C1 of the screw member 10 is made parallel to the seat surface 23 of the insert seat 20a as in the embodiment, a firm clamping force may not be obtained.

The direction of the central axis line C1 of the screw member 10 is preferably set to be different from the moving direction of the clamp member 1. That is, the screw member 10 is moved in a direction inclined with respect to the moving direction of the clamp member 1.

When the screw member 10 is rotated so as to travel in the rearward A2 direction from the clamped state of the clamping device illustrated in FIG. 6A, the rearward facing end shoulder portion 12a of the screw member 10 is engaged with the second screw engagement surface 5 of the clamp member 1, and the force in the A2 direction is applied to the clamp member 1. When the clamp member 1 is pressed in the A2 direction and the second contact surface 1b of the clamp member 1 is engaged with the second sliding surface 22b of the guide hole 22, the second sliding surface 22b converts the force in the A2 direction into a force for moving the clamp member 1 toward an upper part of the guide hole 22. When the clamp member 1 moves toward the upper part of the guide hole 22, the insert contact surface 3 of the clamp portion 2 moves in a direction away from the cutting insert 30. Then, the support surface 6 of the clamp member 1 supports the cutting insert 30 and separates the cutting insert 30 from the insert seat 20a.

Here, the indexable surface 32 of the cutting insert 30 makes contact with the insert contact surface 3 of the clamp member 1 and specifies the rotating direction of the cutting insert 30 on the insert seat 20a. Four indexable surfaces 32 are formed on the upper surface side and four index able surfaces 32 are formed on the lower surface side of the inner peripheral surface, that is, eight indexable surfaces in total. Therefore, the cutting insert 30 can be indexed by 90 degrees each and can be used 4 times on each surface side, or 8 times in total. The number of the indexable surfaces 32 corresponds to the number of uses of the cutting insert 30. However, the number of the indexable surfaces 32 is not limited to the above-described number. For example, the number can be adjusted as appropriate in accordance with the application such as six each on one surface or eight each on one surface. Furthermore, the indexable surface 32 does not have to be provided. When a discrete number of the indexable surfaces 32 is not provided, and instead a ring-shaped ledge is provided on the wall of the mounting hole 31, the number of uses of the cutting insert 30 can be flexibly handled in accordance with the damage state in use. On the other hand, since the position in the rotating direction of the cutting insert 30 cannot be restricted, it becomes difficult to grasp the number of uses. Moreover, if the shape of the cutting insert 30 is not limited to a round plate-like shape but is an unstable outer shape, the position of the cutting edge can easily move. The unstable outer shape means a shape with which the cutting insert can easily rotate in the outer peripheral direction, such as an oval plate-like shape and a substantially polygonal shape having each arc side. In the cutting insert 30 whose outer shape is hard to be restricted, in order to determine the rotating direction in use, it is effective to provide the indexable surface 32. In addition, in the case of the round plate-like cutting insert 30, when the cutting edge does not have a given height but is a wavy cutting edge, it is effective to provide the indexable surface 32 in order to match apex positions of the waves, and thus properly and reliably orient the cutting insert.

In the embodiment, the indexable surface 32 is constituted by substantial planes. Therefore, it is brought into planar contact or line contact with the insert contact surface 3 of the above-described clamp member 1. Even in the line contact, the rotating direction of the cutting insert 30 is regulated. However, the indexable surface 32 is not limited to a plane. The indexable surface 32 may be constituted by curved surfaces, for example. It is only necessary that the rotating direction of the cutting insert 30 in use may be determined. To regulate the rotating direction means that the cutting insert 30 makes contact with the insert contact surface 3 of the clamp member 1, and thus movement of the cutting insert 30 in the rotating direction is in a regulated state.

As to the cutting insert 30 in the embodiment described above, both the upper surface 30a and the lower surface 30b can be used by being formed into symmetrical shapes. The indexable surface 32 for regulating the direction of the cutting insert 30 can be also used as a contact surface in contact with the support surface 6 of the clamp member 1, when it pushes away the cutting insert 30. The cutting insert 30 is supported by the support surface 6 of the clamp member 1, and thus it is pushed to be separated from the insert seat of the tool body 20. Only the upper shoulder surface 6a of the support surface 6 makes contact with the upper surface 30a or the lower surface 30b of the cutting insert 30. Only with the upper shoulder surface 6a, the effect of pushing away the cutting insert 30 can be obtained. In the embodiment, in addition to the upper shoulder surface 6a, the sloped surface 6b and the collar surfaces 6c of the clamp member 1 make contact with the indexable surface 32 of the cutting insert 30. As a result, the cutting insert 30 does not accidentally rotate when being pushed to be separated, but can be removed while preserving its orientation, and thus the direction used. Moreover, the cutting insert does not rotate when being attached, and attachment can be made while the direction to be attached is kept.

In the cutting insert 30 of the embodiment described above, the indexable surface 32 on the upper surface side and the indexable surface 32 on the lower surface side are required to be provided at the same positions when the cutting insert 30 is turned upside down so that the position of the insert's surface of contact is not shifted when being pushed to be separated. Thus, the indexable surfaces 32 are in a relationship of being 180° rotationally symmetric with respect to a transverse axis line TA passing midway between the upper and lower surfaces of the cutting insert 30 (see FIG. 5C). Moreover, in the embodiment, since the indexable surface 32 on the upper surface side and the indexable surface 32 on the lower surface side are in the relationship of rotational symmetry by 180° (or even 90°) with respect to the central axis line CA of the mounting hole in each of the upper surface side and the lower surface side, they are arranged in a relationship of planar symmetry (mirror image) as well, for example, with respect to a plane defined by the transverse axis line TA and the central axis line CA. In order to make this understood more easily, in the embodiment seen above, the mounting hole 31 of the cutting insert 30 is not a cylindrical hole, but instead may be a polygonal, or more specifically, a square hole. However, this shape is not limiting, and so the mounting hole 31 of the present invention may be a cylindrical hole. Portions of the mounting hole 31 not in contact with the insert contact surface 3 of the clamp member 1 may have any shape so long as they do not interfere with other components. It should be noted that when the mounting hole 31 is formed having a cylindrical hole, the cross-sectional shape of the clamp portion 2 of the clamp member 1 is rounded so as to be able to pass inside the cylindrical hole of the mounting hole 31.

In the embodiment, the cutting insert 30 has a round plate-like shape. However, the shape of the cutting insert 30 is not limited to the round plate-like shape. Any shape having the mounting hole 31 can be applied to the cutting insert 30 having any outer shape. Moreover, a portion in contact with the support surface 6 of the clamp member 1 and in which the surface of contact of the cutting insert 30 is formed is not limited to the inner peripheral surface of the mounting hole 31. The cutting insert may have any shape as long as it is formed so that the cutting insert 30 can be pushed to be separated from the insert seat of the tool body 20 when the clamp member 1 retreats from the guide hole 22. However, if the sloped surface 6b of the support surface 6 is formed on the front of the clamp portion 2 of the clamp member 1 (which is the case with the clamp portion 2 seen in FIGS. 4A-4H) and also the surface of contact of the cutting insert 30 is formed inside the mounting hole 31, the direction in which the cutting insert 30 is lifted becomes an optimal direction exactly opposite to the direction in which the cutting insert 30 is fixed.

The first screw engagement surface 4 and the second screw engagement surface 5 are provided on opposite sides sandwiching the through-hole 7. When the cutting insert 30 is to be fixed, the first screw engagement surface 4 of the clamp member 1 is pressed by the forward facing thread shoulder 10b of the screw member 10. When the cutting insert 30 is to be removed, the rearward facing end shoulder portion 12a makes contact with the second screw engagement surface 5 of the clamp member 1, to thereby cause the clamp member 1 to retreat. When the clamp member 1 retreats as described above, the cutting insert 30 is pushed to be separated from the insert seat of the tool body by the support surface 6 of the clamp portion 2. A gap between the upper (narrow) portion 7a of the through-hole 7 of the clamp member 1 and the substantially columnar shaft portion 11 of the screw member 10 is appropriately sized so that the screw member 10 can go back and forth through the gap while the substantially columnar portion 11 is rotating. However, the upper portion 7a should be small enough to ensure that the screw member 10 cannot be fully withdrawn, and that the rearward facing end shoulder portion 12a is stopped by the second screw engagement surface 5 when the screw member 10 travels in the rearward A2 direction. The shape of the diameter enlarged portion 12 of the screw member 10 is not also limited to the shape in the embodiment. The diameter enlarged portion 12 may have any shape as long as the portion has a thickness and shape in which the portion makes contact with the second screw engagement surface 5 of the clamp member 1.

The moving direction of the screw member 10 may be a direction inclined with respect to the seat surface 23 of the insert seat 20a. For example, if the screw member 10 is inclined in a direction away from the cutting insert 30, the clamping force can be further improved. The advancing/retreating direction of the screw member 10 can be adjusted as appropriate in accordance with the thickness or the like of a back metal in the periphery of the insert seat of the tool body 20.

Second Embodiment

A cutting tool to which the clamping device according to a second embodiment of the present invention is applied is illustrated in FIGS. 7A to 9. It should be noted that, in these drawings, the same reference numerals are used for the configuration portions similar to those in the first embodiment.

In a clamp member 1A of the second embodiment, there are provided a nozzle 8 for injecting a liquid or a gas toward the cutting edge of the cutting insert 30 and a fluid path 9 for guiding the liquid or the gas to the nozzle 8. By injecting a cutting fluid or air from the vicinity of the cutting edge, high cooling effect and lubricating effect can be obtained. A fluid path 25 of a tool body 20A is provided so as to connect to the fluid path 9 of the clamp member 1A. To the fluid path 25 of the tool body 20A, various prior-art technologies can be applied. In the embodiment, in order to reduce the length of the clamp member 1A and also to ensure the back metal of the seat surface 23 of the insert seat 20a, the fluid path 25 of the tool body 20A is provided in a direction to be inclined with respect to the seat surface 23 of the insert seat 20a. The direction of the fluid path 25 of the tool body 20A can be changed in the middle. That is, a supply port for the fluid provided at the other end of the fluid path 25 can be arranged at an arbitrary position of the tool body 20. It should be noted that the cross-sectional area of the fluid path 25 of the tool body 20A is preferably set larger than the cross-sectional area of the fluid path 9 of the clamp member 1. When the cross-sectional area of the fluid path 25 of the tool body 20A is set large, a pressure loss of the fluid can be suppressed. Similarly, the cross-sectional area of the fluid path 9 of the clamp member 1 is preferably set larger than the cross-sectional area of the nozzle 8.

Figure 9:
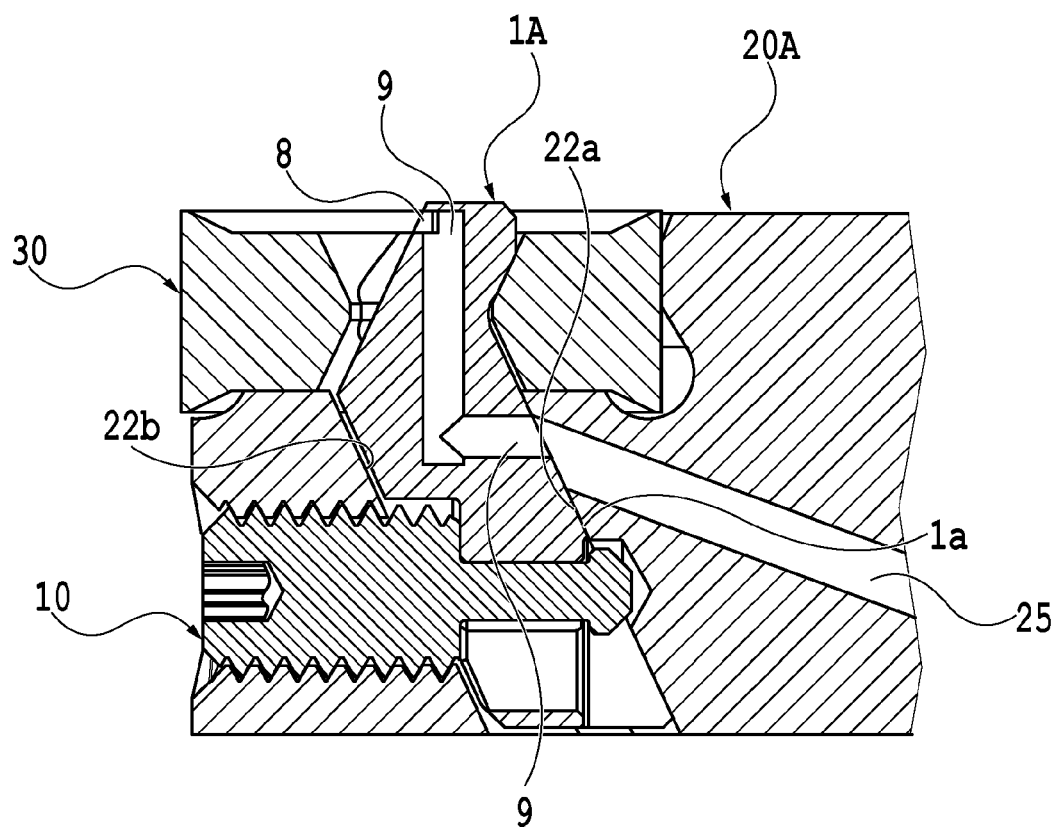
FIG. 9 is a cross-sectional view in IX-IX line direction in FIG. 7B and a view illustrating a clamping device in the clamp state.

When the cutting insert 30 is fixed, as illustrated in FIG. 9, the first contact surface 1a of the clamp member 1A is pressed onto the first sliding surface 22a of the guide hole 22 by the screw member 10. Therefore, since both the first contact surface 1a and the first sliding surface 22a are constituted by planes, they adhere firmly to each other, and a liquid or a gas does not leak easily. In combination with that, high cooling effect and lubrication effect can be maintained. As described above, the first contact surface 1a of the clamp member 1A can have a large width by setting the radius of curvature R1 to an appropriate size.

The tool body 20A in the cutting tool of the second embodiment can be the same as the tool body 20 in the cutting tool of the first embodiment. It should be noted that when a tool body is dedicated for the cutting tool of the first embodiment in which the clamp member 1 does not have nozzle 8 or fluid path 9, the fluid path 25 does not have to be provided in the tool body.

The tool material of the cutting edge and the periphery of the cutting edge of the cutting insert 30 is preferably selected from hard materials such as cemented carbide, cermet, ceramic and cubic boron nitride, or those obtained by coating the surface of these hard materials with PVD or CVD coating film; or diamond.

The material of the clamp members 1 and 1A and the screw member 10 is preferably selected from an alloy steel or a tool steel. That is, a steel material which is easily molded and has high tensile strength and compression strength is preferable.

This clamping device can be used for cutting work of a steel material and the like by being applied to various cutting tools and the cutting tools being attached to a machine tool. This device is applied to a turning tool for a lathe, a rotary cutting tool and the like, and there is little restriction on the cutting tools to be applied. Only the turning tool for a lathe is described in the embodiments, but the clamping device also has high operability and clamping strength in rotary cutting tools.

The clamping device of the present invention is not limited to the above-described embodiments and various modifications and additions are possible within a scope not departing from the gist of the present invention. For example, there can also be employed a structure in which the cutting insert 30 is clamped by withdrawing the screw member 10 in the A2 direction. Moreover, in the above embodiments, the cutting insert of a negative type was described, but the present invention is not limited to that but can be also applied to the cutting insert of a positive type.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A tool body having a clamping device for clamping a cutting insert, comprising:
   an insert seat having an insert seat surface;
   a guide hole formed in the tool body and opening out to the insert seat surface;
   a screw hole formed in a direction intersecting with the guide hole from a side surface of the tool body and connected to the guide hole;
   a clamp member having a clamp portion and being arranged movably in a predetermined guiding direction in the guide hole, the clamp portion having an insert contact surface; and
   a screw member occupying the screw hole and movable in opposite first and second directions along a central axis line of the screw hole; wherein:
   the screw member is configured to engage the clamp member upon movement of the screw member both in the first direction and in the second direction, the screw member applying a force in a first direction to the clamp member when the screw member moves in the first direction and applying a force in a second direction to the clamp member when the screw member moves in the second direction;
   the guide hole has a first sliding surface engaged with the clamp member when the screw member moves in the first direction, the first sliding surface configured to convert the force in the first direction into a force for moving the insert contact surface of the clamp portion in a direction toward a cutting insert, when a cutting insert is seated on the insert seat surface,
   the guide hole has a second sliding surface engaged with the clamp member when the screw member moves in the second direction, the second sliding surface configured to convert the force in the second direction into a force for moving the insert contact surface of the clamp portion in a direction away from a cutting insert, when a cutting insert is seated on the insert seat surface;
   the screw hole is arranged so that its central axis line is substantially parallel to the seat surface of the insert seat;
   the clamp member has a first screw engagement surface which is engaged when the screw member moves in the first direction and a second screw engagement surface which is engaged when the screw member moves in the second direction;
   the clamp member has a first contact surface engaged with the first sliding surface when the screw member moves in the first direction, and a second contact surface engaged with the second sliding surface when the screw member moves in the second direction; and
   the first and second contact surfaces are constituted by planes and inclined with respect to the first and second screw engagement surfaces, respectively.

2. The tool body according to claim 1, wherein the first and second sliding surfaces are constituted by planes and are inclined with respect to the insert seat surface.

3. The tool body according to claim 1, wherein the first and second sliding surfaces are inclined with respect to a side wall surface of the insert seat.

4. The tool body according to claim 1, wherein the first and second screw engagement surfaces are arranged in a direction substantially orthogonal to the central axis line.

5. The tool body according to claim 1, wherein the screw member has:
   a threaded portion,
   a shaft portion extending in a longitudinal direction from a leading end portion of the threaded portion and having a diameter smaller than that of the threaded portion, and
   a diameter enlarged portion formed at a leading end portion of the shaft portion and having a diameter larger than that of the shaft portion.

6. The tool body according to claim 5, wherein the clamp member has:
   a first screw engagement surface which is engaged when the screw member moves in the first direction;
   a second screw engagement surface which is engaged when the screw member moves in the second direction;
   a first insertion portion into which the threaded portion of the screw member cannot be inserted, but the diameter enlarged portion and the shaft portion can be inserted, and
   a second insertion portion connected to the first insertion portion and into which only the shaft portion can be inserted.

7. The tool body according to claim 6, wherein the first insertion portion is formed as a through-hole or a cut-away.

8. The tool body according to claim 6, wherein
   the screw member further has a thread shoulder portion formed between the threaded portion and the shaft portion, the thread shoulder portion being engaged with the first screw engagement surface when the screw member moves in the first direction,
   the screw member further has an end shoulder portion formed between the shaft portion and the diameter enlarged portion, the end shoulder portion being engaged with the second screw engagement surface when the screw member moves in the second direction, and
   the first and second screw engagement surfaces are arranged in a periphery of the second insertion portion.

9. The tool body according to claim 1, wherein the clamp member has:
   a nozzle for injecting a liquid or a gas toward a cutting edge of a cutting insert, when a cutting insert is seated on the insert seat surface; and
   a fluid path for guiding the liquid or the gas to the nozzle.

10. A tool body having a clamping device for clamping a cutting insert, comprising:
    an insert seat having an insert seat surface;
    a guide hole formed in the tool body and opening out to the insert seat surface;
    a screw hole formed in a direction intersecting with the guide hole from a side surface of the tool body and connected to the guide hole;
    a clamp member having a clamp portion and being arranged movably in a predetermined guiding direction in the guide hole, the clamp portion having an insert contact surface; and
    a screw member occupying the screw hole and movable in opposite first and second directions along a central axis line of the screw hole; wherein:
    the screw member is configured to engage the clamp member upon movement of the screw member both in the first direction and in the second direction, the screw member applying a force in a first direction to the clamp member when the screw member moves in the first direction and applying a force in a second direction to the clamp member when the screw member moves in the second direction;

the guide hole has a first sliding surface engaged with the clamp member when the screw member moves in the first direction, the first sliding surface configured to convert the force in the first direction into a force for moving the insert contact surface of the clamp portion in a direction toward a cutting insert, when a cutting insert is seated on the insert seat surface, and the guide hole has a second sliding surface engaged with the clamp member when the screw member moves in the second direction, the second sliding surface configured to convert the force in the second direction into a force for moving the insert contact surface of the clamp portion in a direction away from a cutting insert, when a cutting insert is seated on the insert seat surface; and wherein the clamp member has:

a main portion connected to the clamp portion and comprising:

opposing first and second contact surfaces;

a long hole having a central axis line and extending between the first and second contact surfaces, the long hole comprising a first insertion portion and a second insertion portion connected to the first insertion portion, the first insertion portion being wider than the second insertion portion and further from the clamp portion than the second insertion portion;

a first screw engagement surface formed in a periphery of the second insertion portion on a side of the first contact surface; and a second screw engagement surface formed in a periphery of the second insertion portion on a side of the second contact surface; wherein:

the first and second screw engagement surfaces are arranged in a direction substantially orthogonal to the central axis line; and the first and second contact surfaces are constituted by planes and inclined with respect to the first and second screw engagement surfaces, respectively.

11. A cutting tool comprising:

the tool body according to claim 1 and a cutting insert seated in the insert seat.

12. The cutting tool according to claim 11, wherein the cutting insert has mutually opposing upper and lower surfaces, a side surface extending between the upper and lower surfaces, and a mounting hole penetrating the upper and lower surfaces;

the insert contact surface of the clamp portion of the clamp member is configured to make contact with an inner peripheral surface of the mounting hole; and the inner peripheral surface of the mounting hole of the cutting insert has an indexable surface making contact with the insert contact surface and regulating a direction in the insert seat of the cutting insert.

13. The cutting tool according to claim 12, wherein the cutting insert has a plurality of indexable surfaces formed in a peripheral direction of the inner peripheral surface of the mounting hole.

14. The cutting tool according to claim 13, wherein the cutting insert can be used both on the upper surface and the lower surface; and the plurality of indexable surfaces also function as surfaces of contact for contacting a support surface formed on the clamp portion, for supporting the cutting insert and for separating the cutting insert from the insert seat, when the clamp portion of the clamp member moves upward and in a direction away from the cutting insert.

15. The cutting tool according to claim 11, wherein the cutting insert is double-sided and comprises:

mutually opposing upper and lower surfaces;

a side surface extending between the upper and lower surfaces; and a mounting hole penetrating the upper and lower surfaces and having a central axis line (CA) passing through the upper and lower surfaces;

the mounting hole having a polygonal inner peripheral surface defined by a plurality of indexable surfaces, each configured for regulating a direction of seating of the cutting insert;

the indexable surfaces being rotationally symmetric with respect to the central axis line (CA);

the indexable surfaces being 180° rotationally symmetric with respect to a transverse axis line (TA) passing midway between the upper and lower surfaces of the cutting insert; and the indexable surfaces being mirror symmetric with respect to a plane defined by the transverse axis line (TA) and the central axis line (CA).

16. A clamp member for clamping a cutting insert in a tool body, the clamp member comprising:

a clamp portion provided with an insert contact surface; and a main portion connected to the clamp portion and comprising:

opposing first and second contact surfaces;

a long hole having a central axis line and extending between the first and second contact surfaces, the long hole comprising a first insertion portion and a second insertion portion connected to the first insertion portion, the first insertion portion being wider than the second insertion portion and further from the clamp portion than the second insertion portion;

a first screw engagement surface formed in a periphery of the second insertion portion on a side of the first contact surface; and a second screw engagement surface formed in a periphery of the second insertion portion on a side of the second contact surface; wherein:

the first and second screw engagement surfaces are arranged in a direction substantially orthogonal to the central axis line; and the first and second contact surfaces are constituted by planes and inclined with respect to the first and second screw engagement surfaces, respectively.

17. A tool body having a clamping device for clamping a cutting insert, comprising:

an insert seat having an insert seat surface;

a guide hole formed in the tool body and opening out to the insert seat surface;

a screw hole having a central axis line (C1) and intersecting the guide hole from a side surface of the tool body, the screw hole passing beneath the insert seat surface;

a clamp member occupying the guide hole and configured to slidably move within the guide hole, the clamp member having a clamp portion provided with an insert contact surface and a lower portion provided with a clamp member hole; and a screw member occupying the screw hole and passing through the clamp member hole, with a threaded portion of the screw member located beneath the insert seat surface; wherein:

the screw member is movable in a first direction (A1), in which first direction the screw member further enters the screw hole and causes the clamp member to be lowered within the guide hole into an insert clamping position;

the screw member is movable in a second direction (A2) opposite the first direction, in which second direction the screw member is withdrawn from the screw hole and causes the clamp member to rise within the guide hole into an insert releasing position;

the guide hole has a first sliding surface engaged with the clamp member when the screw member moves in the first direction, the first sliding surface configured to convert movement of the screw member in the first direction into a first force for moving the clamp portion's insert contact surface toward a cutting insert, when a cutting insert is seated on the insert seat surface, and the guide hole has a second sliding surface engaged with the clamp member when the screw member moves in the second direction, the second sliding surface configured to convert movement of the screw member in the second direction into a second force for moving the insert contact surface of the clamp portion in a direction away from a cutting insert, when a cutting insert is seated on the insert seat surface.

18. A cutting tool comprising:

the tool body according to claim 17 and a cutting insert seated in the insert seat.

\* \* \* \* \*